United States Patent [19]

Kanno

[11] Patent Number: 5,663,839
[45] Date of Patent: Sep. 2, 1997

[54] ZOOM LENS BARREL HAVING A ROTATABLE DIAPHRAGM MECHANISM AND A MECHANISM FOR CORRECTING AN APERTURE DIAMETER DURING ZOOMING

[75] Inventor: Hideo Kanno, Chiba, Japan

[73] Assignee: Nikon Corporation, Tokyo, Japan

[21] Appl. No.: 525,077

[22] Filed: Sep. 8, 1995

[30] Foreign Application Priority Data

Feb. 24, 1995 [JP] Japan ................................ 7-036778

[51] Int. Cl.$^6$ ............................ G02B 15/14; G02B 1/18; G02B 9/00
[52] U.S. Cl. ...................... 359/700; 359/702; 359/694; 396/103; 396/461
[58] Field of Search ................................ 359/700, 694, 359/702, 739, 740; 354/195.11, 272, 232

[56] References Cited

U.S. PATENT DOCUMENTS

| | | | |
|---|---|---|---|
| 4,141,636 | 2/1979 | Shimojima | 354/196 |
| 4,233,472 | 11/1980 | Haraguchi | 359/694 |
| 4,258,996 | 3/1981 | Uesugi | 359/196 |
| 4,448,496 | 5/1984 | Isobe | 359/705 |
| 4,544,240 | 10/1985 | Shimizu | 359/702 |
| 4,717,933 | 1/1988 | Ando | 354/409 |
| 4,920,369 | 4/1990 | Kaneda | 354/400 |
| 5,099,263 | 3/1992 | Matsumoto | 354/195.12 |
| 5,144,490 | 9/1992 | Yamanouchi | 359/694 |
| 5,200,860 | 4/1993 | Hirasawa | 359/696 |
| 5,339,126 | 8/1994 | Shimose | 354/195.12 |
| 5,410,432 | 4/1995 | Kobayashi | 359/740 |
| 5,467,158 | 11/1995 | Murashima | 354/173.1 |

Primary Examiner—Georgia Y. Epps
Assistant Examiner—Ricky Mack

[57] ABSTRACT

A zoom lens barrel has a first lens unit, a second lens unit sharing an optical axis with the first lens unit, a fixed barrel for containing the first lens unit and the second lens unit, a first lens unit shifting frame held in the fixed barrel so as to be shiftable in a direction of the optical axis or in a direction around the optical axis for holding the first lens unit, a second lens unit shifting frame held in the lens unit shifting frame so as to be shiftable in a direction of the optical axis or in a direction around the optical axis for holding the second lens unit, a zooming mechanism held by the fixed barrel so as to be rotatable around the optical axis for shifting the first lens unit shifting frame in the optical axis direction to perform zooming when the zooming mechanism is rotated around the optical axis, a focusing mechanism held by the fixed barrel so as to be rotatable around the optical axis for rotating the second lens unit shifting frame around the optical axis and shifting the second lens unit shifting frame in the optical axis direction to perform focusing when the focusing mechanism is rotated around the optical axis, a diaphragm mechanism held by the second lens unit shifting frame so as to be rotatable around the optical axis for adjusting an aperture diameter when the diaphragm mechanism is rotated, and a diaphragm correcting mechanism.

4 Claims, 2 Drawing Sheets

ZOOM LENS BARREL HAVING A ROTATABLE DIAPHRAGM MECHANISM AND A MECHANISM FOR CORRECTING AN APERTURE DIAMETER DURING ZOOMING

BACKGROUND OF THE INVENTION

1. Field of the Invention

The present invention relates to a zoom lens barrel and more particularly to a zoom lens which has a diaphragm mechanism provided on a lens unit to be shifted in zooming in an optical axis direction and to be shifted in focusing in the optical axis direction while being rotated, and has a mechanism for correcting an aperture diameter during zooming.

2. Related Background Art

Conventionally, in a zoom lens barrel adopting a focusing system called "whole element focusing" or "front element focusing", a diaphragm mechanism is held on a lens unit shifting frame not to be rotated in zooming and focusing.

In this type of diaphragm mechanism, its aperture diameter is varied by rotating a supporting member of aperture blades of the diaphragm mechanism by means of a lever with a cam surface from a fixed barrel containing the lens unit shifting frame, or another lens unit shifting frame not to be rotated.

On the other hand, recently, a zoom lens barrel adopting a focusing system called "internal focusing" has been proposed in which the zoom lens is made compact and a taking range is enlarged by varying the focal length of lens units and reducing the amount of shift of the lens units.

However, in the conventional internal focusing zoom lens barrel, a lens unit holding a diaphragm mechanism is not rotated in zooming but rotated in focusing. Therefore, the diaphragm mechanism is rotated in focusing. However, in this case, it is difficult to correct the aperture diameter by means of the conventional diaphragm mechanism and various problems have occurred.

SUMMARY OF THE INVENTION

It is an object of the present invention to provide a zoom lens with a diaphragm correcting mechanism by which the aperture diameter can be corrected accurately at the time of zooming even though a diaphragm mechanism is rotated at the time of focusing.

In order to achieve the above object, the present invention is characterized in that in a zoom lens barrel having a lens unit (L1, L4); the other lens unit (L2, L3) sharing an optical axis with the lens unit (L1, L4); a fixed barrel (7) for containing the lens unit (L1, L4) and the other lens unit (L2, L3); a lens unit shifting frame (1) held in the fixed barrel (7) so as to be shiftable in a direction of the optical axis or in a direction around the optical axis for holding the lens unit (L1, L4); the other lens unit shifting frame (2, 3) held in the lens unit shifting frame (1) so as to be shiftable in a direction of the optical axis or in a direction around the optical axis for holding the other lens unit (L2, L3). A zooming mechanism (4, 5, 9, 101, 105) is held by the fixed barrel (7) so as to be rotatable around the optical axis for shifting the lens unit shifting frame (1) in the optical axis direction to perform zooming when the zooming mechanism (4, 5, 9, 101, 105) is rotated around the optical axis. A focusing mechanism (4, 5, 8, 104, 107) is held by the fixed barrel (7) so as to be rotatable around the optical axis for rotating the other lens unit shifting frame (2, 3) around the optical axis and shifting the other lens unit shifting frame (2, 3) in the optical axis direction to perform focusing when the focusing mechanism (4, 5, 8, 104, 107) is rotated around the optical axis. A diaphragm mechanism (6, 62–67) is held by the other lens unit shifting frame (2, 3) so as to be rotatable around the optical axis for adjusting an aperture diameter when the diaphragm mechanism (6, 62–67) is rotated, a diaphragm correcting mechanism is provided which has a first guide member (71) provided in the fixed barrel (7) so as to be slightly inclined with respect to the optical axis; a first guided member (101) provided on the lens unit shifting frame (1), the first guided member (101) being guided by the first guide member (71) to slightly rotate the lens unit shifting frame (1) around the optical axis at the time of the zooming. A diaphragm mechanism supporting plate (61) is held by the other lens unit shifting frame (2, 3) so as to be rotatable around the optical axis for rotating the diaphragm mechanism (6) when the diaphragm mechanism supporting member (61) is rotated around the optical axis. An interlocking member (11, 102) is provided so as to be interlocked with the lens unit shifting frame (1) for transmitting rotation of the lens unit shifting frame (1) to the diaphragm mechanism supporting member (61).

In the above-structured zoom lens barrel, at the time of focusing, the other lens unit shifting frame (2, 3) is rotated around the optical axis and shifted in the optical axis direction. The diaphragm mechanism (6) is held by the other lens unit shifting frame (2, 3) so as to be rotatable around the optical axis. Also, at the time of zooming, the first guided member (101) of the lens unit shifting frame (1) is guided by the first guide member (71) slightly inclined with respect to the optical axis, so that the lens unit shifting frame (1) is slightly rotated around the optical axis. This slight rotation is transmitted to the diaphragm supporting plate (61) by the interlocking member (11, 102). The diaphragm mechanism supporting member (61) is rotated around the optical axis thereby rotating the diaphragm mechanism (6). When the diaphragm mechanism (6) is rotated, the aperture diameter is adjusted. Thereby, aperture correction is carried out.

In a preferred embodiment, in the above zoom lens barrel, the zooming mechanism has a rotating member (9) which is rotated around the optical axis at the time of the zooming and has a second guide member (91). A cam member (4) has a second guided member (105) and a third guide member (41), and is rotated around the optical axis at the time of the zooming with the second guided member (105) guided by the second guide member (91). The first guided member (101) is guided by the third guide member (41) and the first guide member (71), so that at the time of the zooming, the first lens unit shifting frame (1) is shifted in the optical axis direction while being slightly rotated around the optical axis.

According to the zoom lens barrel of the above embodiment, at the time of the zooming, the rotating member (9) is rotated around the optical axis. Owing to the rotation of the rotating member (9), the second guide member (91) of the rotating member (9) guides the second guided member (105) of the cam member (4), whereby the cam member (4) is rotated. Owing to the rotation of the cam member (4), the third guide member (41) of the cam member (4) guides the first guided member (101). As the first guided member (101) is guided by the third guide member (41) and the first guide member (71), the lens unit shifting frame (1) is shifted in the optical axis direction at the time of the zooming while being rotated slightly around the optical axis. Thereby, the aperture correction is performed accurately.

In a zoom lens barrel of another preferred embodiment, the fixed barrel (7) has a cylindrical portion (7c). The lens unit shifting frame (1) has a cylindrical portion (1b). The first guide member is a first elongated opening (71) formed in a peripheral surface of the cylindrical portion (7c) of the fixed barrel (7) so as to be inclined slightly with respect to the optical axis. The first guided member is a projection (101) which is provided so as to project outside a peripheral surface of the cylindrical portion (1b) of the lens unit shifting frame (1) and fitted in the first elongated opening (71).

According to the above embodiment, the first guide member is the first elongated opening (71) formed in the peripheral surface of the cylindrical portion (7c) of the fixed barrel (7) so as to be inclined slightly with respect to the optical axis. The first guided member is the projection provided so as to project outside the peripheral surface Of the cylindrical portion (1b) of the lens unit shifting frame (1). The projection (101) is fitted in the first elongated opening (71). Therefore, the first guide member guides the first guided member accurately.

In a zoom lens barrel of still another preferred embodiment, the lens unit shifting frame (1) has a cylindrical portion (1b). The interlocking member has a second elongated opening (11) formed in a peripheral surface of the cylindrical portion (1b) of the lens unit shifting frame (1) in parallel with said optical axis. A stick-like member (102) has one end that is fixed to the diaphragm mechanism supporting member (61) and another end that end is fitted in the second elongated opening (11).

According to the above embodiment, the lens unit shifting frame (1) includes the cylindrical portion (1b). The interlocking member includes the second elongated opening (11) and the stick-like member (102). The elongated opening (11) is formed in the peripheral surface of the cylindrical portion (1b) of the lens unit shifting frame (1) in parallel with the optical axis. Also, one end portion of the stick-like member (102) is fixed to the diaphragm mechanism supporting member (61) and the other end portion thereof is fitted in the second elongated opening (11). Therefore, the interlocking member will not prevent the lens unit shifting frame (1) from shifting in the optical axis direction, and the slight rotation of the lens unit shifting frame (1) around the optical axis at the time of the zooming is transmitted to the diaphragm mechanism supporting member (61) accurately.

DESCRIPTION OF THE PREFERRED EMBODIMENTS (First Embodiment)

Figure 1:
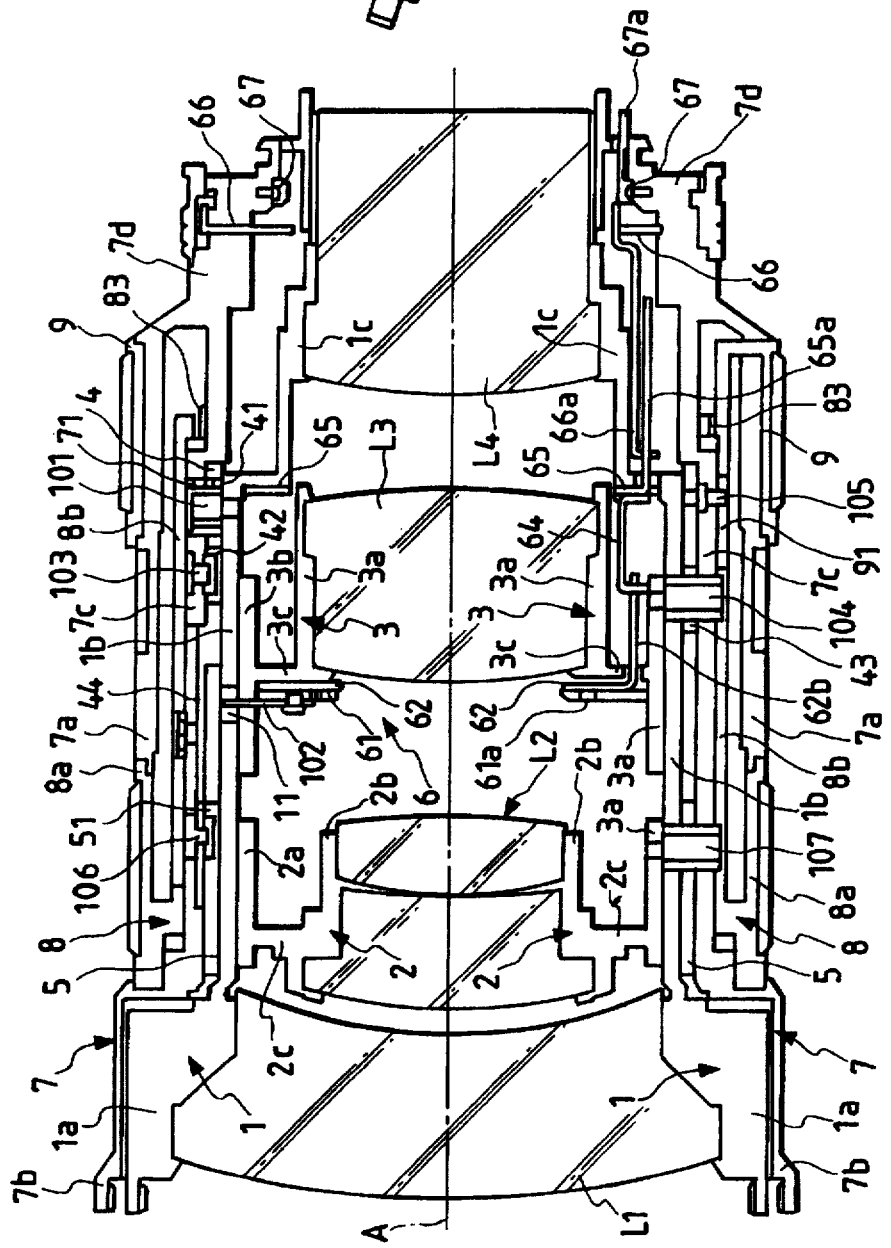
FIG. 1A is a vertical sectional view of a zoom lens barrel with a diaphragm correcting mechanism according to an embodiment of the present invention.
FIG. 1B is a front view of the diaphragm drive plate of the zoom lens barrel of FIG. 1A.
Figure 2:
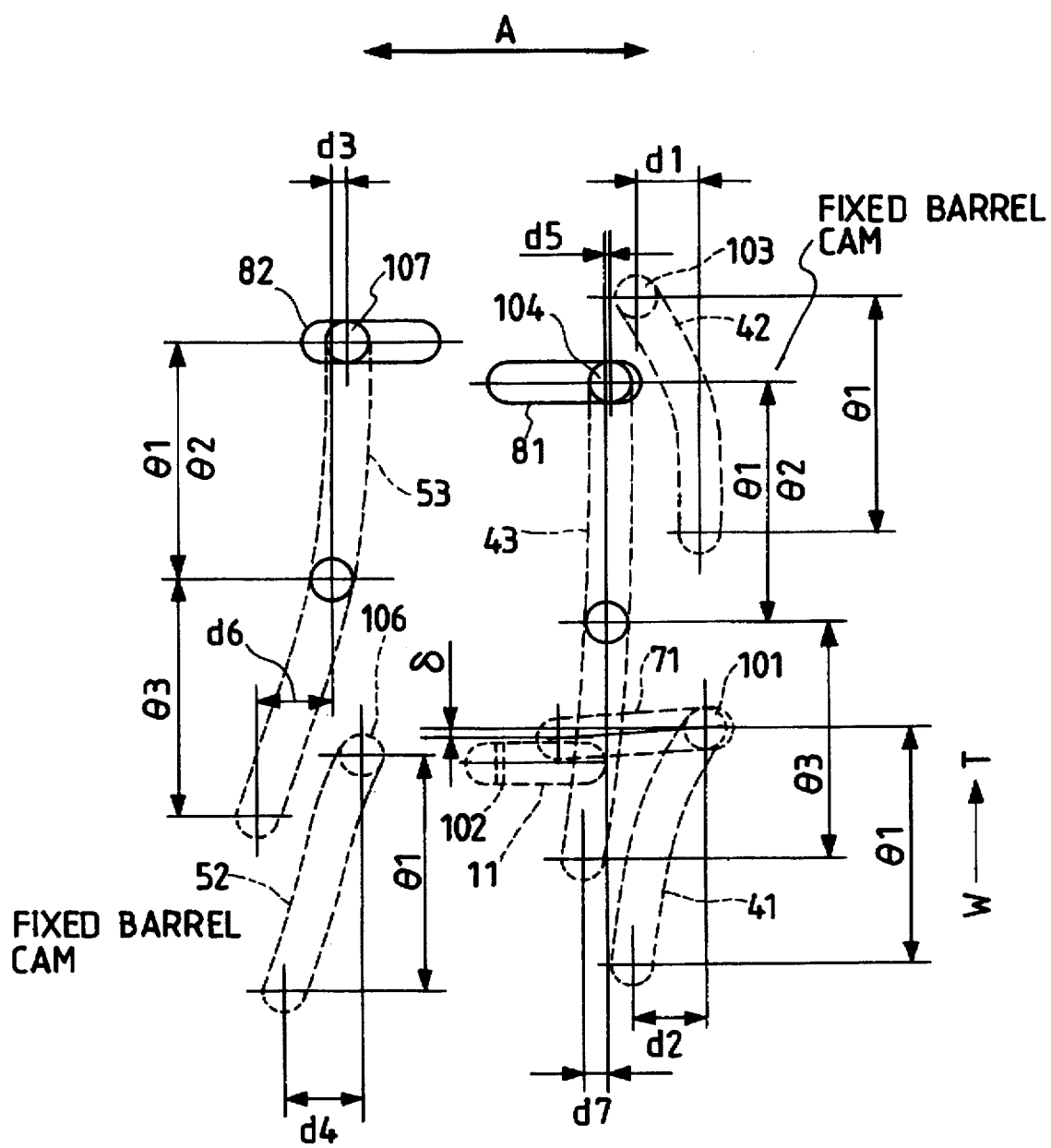
FIG. 2 is an exploded view of the cam pins and the guide grooves of the zoom lens barrel of FIG. 1A.

FIG. 1A shows the structure of a zoom lens barrel with an aperture correcting mechanism according to a first embodiment of the present invention. FIG. 1A is a vertical sectional view of the zoom lens barrel and FIG. 1B is a front view of a diaphragm drive plate of the zoom lens barrel. FIG. 2 is an exploded view of cam portions for explaining movements of respective lens units of the zoom lens barrel, wherein A is a direction of the optical axis, T is a telephoto side, and W is a wide side.

As shown in FIG. 1A, the zoom lens barrel has a first lens unit L1, a second lens unit L2, a third lens unit L3, a fourth lens unit L4, a first lens unit shifting frame 1, a second lens unit shifting frame 2, a third lens unit shifting frame 3, a first cam ring 4, a second cam ring 5, a diaphragm mechanism 6, a fixed barrel 7, a focus ring 8 and a zoom ring 9.

The first lens unit L1 is a group of lenses and the amount of shift thereof in zooming is expressed by (d1+d2) in FIG. 2.

The second lens unit L2 is a group of lenses and the amount of shift thereof in zooming is expressed by (d3−d4) in FIG. 2. Also, the second lens unit L2 is shifted along the optical axis A for a predetermined amount toward the telephoto side or the wide side in focusing.

The third lens unit L3 is a group of lenses and the amount of shift thereof in zooming is expressed by (d1+d5). Also, the third lens unit L3 is shifted along the optical axis A for a predetermined amount toward the telephoto side or the wide side in focusing in a similar manner to the second lens unit L2.

The fourth lens unit L4 is a group of lenses and is connected to the first lens unit L1 by the first lens unit shifting frame 1 to be one body.

The first lens unit L1 and the fourth lens unit L4 constitute a first lens unit while the second lens unit L2 and the third lens unit L3 constitute a second lens unit.

The first lens unit shifting frame 1 corresponds to a lens unit shifting frame and has a large diameter cylindrical portion 1a in the vicinity of its front end, a small diameter cylindrical portion 1c in the vicinity of its rear end and a medium diameter cylindrical portion 1b between the portions 1a and 1c. The first lens unit L1 is held on the inner peripheral surface of the cylindrical portion 1a of the first lens unit shifting frame 1 while the fourth lens unit L4 is held on the inner peripheral surface of the cylindrical portion 1c thereof. As shown in FIG. 2, the medium diameter portion 1b of the first lens unit shifting frame 1 is provided in its peripheral surface with a guide groove 11 of an elongated opening parallel to the optical axis A.

The cylindrical first cam ring 4 is fitted on the outer peripheral surface of the medium diameter portion 1b of the first lens unit shifting frame 1 close to the third lens unit L3. The first cam ring 4 can be rotated around the optical axis A and moved forwardly or rearwardly in the direction of the optical axis A. Also, the cylindrical second cam ring 5 is fitted on the outer peripheral surface of the medium diameter portion 1b of the first lens unit shifting frame 1 close to the first lens unit L1. The second cam ring 5 can be rotated around the optical axis A.

The fixed barrel 7 has an outer barrel portion 7a, an inner barrel portion and a base barrel portion 7d. The inner barrel portion has a large diameter inner barrel portion 7b and a medium diameter inner barrel portion 7c. On the outer peripheral surfaces of the first and second cam rings 4, 5 is fitted the medium diameter inner barrel portion 7c of the fixed barrel 7. Also, on the outer peripheral surface of the large diameter portion 1a of the first lens unit shifting frame 1 is fitted the large diameter inner barrel portion 7b of the fixed barrel 7. Further, an outer barrel portion 8a of the focus ring 8 is fitted on the outer barrel portion 7a so as to be rotatable through a predetermined angle.

The second lens unit shifting frame 2 has a large diameter outer barrel portion 2a, an inner barrel portion 2b with a diameter smaller than that of the outer barrel portion 2a, and a collar portion 2c. The center portion of the outer barrel portion 2a is integrated with the front end portion of the inner barrel portion 2b via the collar portion 2c. The second lens unit L2 is held on the inner peripheral surface of the inner barrel portion 2b. Also, the outer barrel portion 2a is fitted on the inner peripheral surface of the medium diameter portion 1b of the first lens unit shifting frame 1 on the side of the first lens unit L1.

The third lens unit shifting frame 3 has a large diameter outer barrel portion 3b, an inner barrel portion 3a with a diameter smaller than that of the outer barrel portion 3b, and a collar portion 3c. The center portion of the outer barrel portion 3b is integrated with the front end portion of the inner barrel portion 3a via the collar portion 3c. The third lens unit L3 is held on the inner peripheral surface of the inner barrel portion 3a. Also, the outer barrel portion 3b is fitted on the inner peripheral surface of the medium diameter portion 1b of the first lens unit shifting frame 1 on the side of the fourth lens unit L4.

A diaphragm supporting plate 61 is held rotatably on the collar portion 3c of the third lens unit shifting frame 3 so as to sandwich a diaphragm drive plate 62. An end of a key 102 of a stick-like member is secured to the diaphragm supporting plate 61. The other end of the key 102 is inserted in the guide groove 11, as shown in FIG. 2. Therefore, the first lens unit shifting frame 1 and the diaphragm supporting plate 61 can be rotated together around the optical axis A. The diaphragm supporting plate 61 is provided with holes 61a. The second lens unit shifting frame 2 and the third lens unit shifting frame 3 constitute the other lens unit shifting frame.

A cam pin 101 is planted on the outer surface of an end portion of the medium diameter portion 1b of the first lens unit shifting frame 1 on the side of the fourth lens unit L4 so as to project outside. The cam pin 101 penetrates through a cam groove 41 of the first cam ring 4 and is fitted in a guide groove 71 provided in the peripheral surface of the fixed barrel 7. The guide groove 71 is, as shown in FIG. 2, an elongated opening which is inclined at a small angle δ with respect to the optical axis A of the fixed barrel 7. In the above, the cam groove 41 corresponds to a third guide member.

The first cam ring 4 corresponds to a cam member and has, as shown in FIG. 2, the cam groove 41, a cam groove 42 and a cam groove 43. The above cam pin 101 penetrates through the cam groove 41. A cam pin 103 is fitted in the cam groove 42. The cam pin 103 is planted on the inner peripheral surface of the inner barrel portion 7c of the fixed barrel 7. A cam pin 104 is fitted in the cam groove 43. The cam pin 104 is planted on the outer peripheral surface of an end of the outer barrel portion 3b of the third lens unit shifting frame 3 on the side of the fourth lens unit L4. The cam groove 43 is the composition of a first zooming cam and a first focus cam.

A pin 105 of a second guided member is planted on the outer peripheral surface of the first cam ring 4. The tip portion of the pin 105 is fitted in a guide groove 91. The guide groove 91 corresponds to a second guide member and is formed in an inner peripheral portion of the zoom ring 9 of a rotating member in parallel with the optical axis A.

Also, a lever 44 is provided on an end of the first cam ring 4 on the side of the second lens unit L2. A protrusion 51 is provided on the second cam ring 5 in the vicinity of an end portion of the lever 44 on the side of the second lens unit L2. The lever 44 is engaged with the protrusion 51. According to this structure, the first cam ring 4 and the second cam ring 5 are rotated together around the optical axis A.

The second cam ring 5 is formed with a cam groove 52 and a cam groove 53. A cam pin 106 is fitted in the cam groove 52. The cam pin 106 is planted on the inner peripheral surface of the inner barrel portion 7c of the fixed barrel 7. Also, a cam pin 107 is fitted in the cam groove 53. The cam pin 107 is planted on the outer peripheral surface of an end of the outer barrel portion 2a of the second lens unit shifting frame 2 on the side of the third lens unit L3. The cam groove 53 is the composition of a second zooming cam and a second focus cam.

According to the above structure, when the zoom ring 9 is rotated around the optical axis A, the guide groove 91 of the zoom ring 9 presses the pin 105 of the first cam ring 4, so the first cam ring 4 is rotated together. Also, as the cam groove 42 of the first cam ring 4 is pressed by the cam pin 103, the first cam ring 4 is shifted d1 toward the first lens unit L1 in parallel with the optical axis A. Also, since the cam pin 101 planted on the medium diameter portion 1b of the first lens unit shifting frame 1 penetrates through the cam groove 41 of the first cam ring 4 and is fitted in the guide groove 71 of the fixed barrel 7 inclined slightly with respect to the optical axis A, simultaneously with the above operation, the first lens unit shifting frame 1 is shifted d2 along the optical axis A thereby to perform zooming while being rotated through a slight amount around the optical axis A. At this time, the amount of shift of the first lens unit shifting frame 1 becomes (d1+d2) differently from the amount of shift of the first cam ring 4. The first cam ring 4, the second cam ring 5, the zoom ring 9, the cam pin 101 and the pin 105 constitute a zooming mechanism.

Further, the cam groove 43 composed of the first focus cam and the first zooming cam is formed in the first cam ring 4. Also, the cam pin 104 planted on the third lens unit shifting frame 3 penetrates through the cam groove 43 of the first cam ring 4 and is fitted in the guide groove 81 formed in the focus ring 8 in parallel with the optical axis A. Therefore, in a state where the focus ring 8 is not rotated, the guide groove 81 serves as a groove for guiding the third lens unit shifting frame 3 to shift straightly. In the state where the focus ring 8 is not rotated, when the first cam ring 4 is rotated, the third lens unit shifting frame 3 is shifted for the total amount (d1+d5) of the amount of shift (d1) of the first cam ring 4 and the length d5 of the cam groove 43 in the direction of the optical axis A with respect to a zoom rotation angle θ1 in the direction of the optical axis A.

Similarly, the second cam ring 5 is formed with the cam groove 53 composed of the second focus cam and the second zooming cam. Also, the cam pin 107 planted on the second lens unit shifting frame 2 penetrates through the cam groove 53 of the second cam ring 5, and is fitted in the guide groove 82 provided in the focus ring 8 in parallel with the optical axis A. Therefore, in the state where the focus ring 8 is not rotated, the guide groove 82 serves as a groove for guiding the second lens unit shifting frame 2 to shift straightly. In the state where the focus ring 8 is not rotated, when the second cam ring 5 is rotated, the second lens unit shifting frame 2 is shifted for the total amount (d3−d4) of the amount of shift d4 of the second cam ring 5 and the length d3 of the cam groove 53 in the direction of the optical axis A with respect to the zoom rotation angle θ1 in the direction of the optical axis A.

Also, according to the above structure, when the zoom ring 9 is rotated around the optical axis A, the first cam ring 4 is rotated, and accordingly, the second cam ring 5 is rotated together with the first cam ring 4. When the second cam ring 5 is rotated, as the cam pin 106 is planted on the inner peripheral surface of the medium diameter inner barrel portion 7c of the fixed barrel 7 and the cam pin 106 is fitted in the cam groove 52 of the second cam ring 5, the cam pin 106 is stationary, but the second cam ring 5 is shifted along the optical axis A toward the third lens unit L3.

The focus ring 8 has a large diameter outer barrel portion 8a and a medium diameter inner barrel portion 8b. The outer barrel portion 8a is fitted on the outer barrel portion 7a of the fixed barrel 7 so as to be rotatable through a predetermined angle. The guide groove 82 parallel to the optical axis A is formed in the focus ring 8. The cam pin 107 planted on the second lens unit shifting frame 2 penetrates through the cam groove 53 of the second cam ring 5 and is fitted in the guide groove 82.

Therefore, when the focus ring 8 is rotated around the optical axis A, the guide groove 82 of the focus ring 8 presses the cam pin 107, so the second lens unit shifting frame 2 is rotated together. At this time, simultaneously, the cam pin 107 is rotated along the cam groove 53 of the second cam ring 5, so that the second lens unit shifting frame 2 with the cam pin 107 planted thereon is shifted for a predetermined amount thereby to perform focusing.

In the case of the wide side, the second lens unit shifting frame 2 is shifted for a predetermined amount d3 in the direction of the optical axis A while being rotated through a rotation angle θ2. On the other hand, in the case of the telephoto side, it is shifted for a predetermined amount d6 in the direction of the optical axis A while being rotated through a rotation angle θ3. The rotation angle of the focus ring 8 is constant in the wide side as well as in the telephoto side.

Similarly, the cam pin 104 planted on the third lens unit shifting frame 3 penetrates through the cam groove 43 of the first cam ring 4 and is fitted in the guide groove 81 provided in the focus ring 8 in parallel with the optical axis A.

Therefore, when the focus ring 8 is rotated around the optical axis A, the guide groove 81 of the focus ring 8 presses the cam pin 104, so the third lens unit shifting frame 3 is rotated together. At this time, simultaneously, the cam pin 104 is rotated along the cam groove 43 of the first cam ring 4, so that the third lens unit shifting frame 3 with the cam pin 104 planted thereon is shifted for a predetermined amount along the optical axis A thereby to perform focusing. In the above, the first cam ring 4, the second cam ring 5, the focus ring 8, the cam pin 104 and the cam pin 107 constitute a focusing mechanism.

In the case of the wide side, the third lens unit shifting frame 3 is shifted for a predetermined amount d5 in the direction of the optical axis A while being rotated through the rotation angle θ2. On the other hand, in the case of the telephoto side, it is shifted for a predetermined amount d7 in the direction of the optical axis A while being rotated through the rotation angle θ3. That is, in the zoom lens barrel of this embodiment, focusing is performed by shifting the second lens unit shifting frame 2 and the third lens unit shifting frame 3 for the respectively predetermined amounts simultaneously along the optical axis A.

Also, the inner barrel portion 8b of the focus ring 8 is fitted on the outer peripheral surface of the medium diameter inner barrel portion 7c of the fixed barrel 7. Further, a segment gear 83 is provided on an end of the inner barrel portion 8b of the focus ring 8 on the side of the fourth lens unit L4, and engaged with a coupling gear (now shown). Therefore, when carrying out manual focusing, the focus ring 8 is rotated manually. On the other hand, when carrying out automatic focusing, the coupling gear is rotated by the camera body, whereby the segment gear 83 is rotated for the automatic focusing.

The cam pin 104 is planted on the end of the outer peripheral surface of the outer barrel portion 3b of the third lens unit shifting frame 3 on the side of the fourth lens unit L4. The cam pin 104 penetrates through the cam groove 43 composed of the first zoom cam and the first focus cam which is formed in the first cam ring 4. The tip portion of the cam pin 104 is fitted in the guide groove 81 provided in the inner barrel portion 8b of the focus ring 8 in parallel with the optical axis A.

As shown in FIGS. 1A and 1B, a diaphragm mechanism 6 is constituted of the diaphragm drive plate 62, a plurality of aperture blades 63, a lever 64, a coupled drive ring 65, a drive ring 66 and a diaphragm control ring 67. The diaphragm drive plate 62 is fitted on the collar portion 3c of the third lens unit shifting frame 3 so as to be rotatable around the optical axis A. The diaphragm drive plate 62 is provided with cam grooves 62a. Drive pins 63b of the aperture blades 63 are fitted in the respective cam grooves 62a. The plurality of aperture blades 63 are provided on the diaphragm drive plate 62 along its periphery. Rotation center pins 63a of the aperture blades 63 are fitted in the respective holes 61a formed in the diaphragm supporting plate 61. Therefore, in a state where the diaphragm supporting plate 61 is stationary, when the diaphragm drive plate 62 is rotated through a predetermined angle, the aperture blades 63 are rotated and stopped down to provide a predetermined aperture diameter.

The diaphragm drive plate 62 has an end portion 62b extending toward the fourth lens unit L4 in parallel with the optical axis A. The end portion 62b is engaged with the lever 64. The lever 64 is fixed to the coupled drive ring 65. The coupled drive ring 65 is held on an end of the medium diameter portion 1b of the first lens unit shifting frame 1 on the side of the fourth lens unit L4 so as to be rotatable around the optical axis A. The coupled drive ring 65 has an extended portion 65a extending toward the fourth lens unit L4 in parallel with the optical axis A. The extended portion 65a is engaged with an engaging rod 66a. The engaging rod 66a is secured to the drive ring 66. The drive ring 66 is held by the inner peripheral surface of the base portion 7d of the fixed barrel 7 so as to be rotatable around the optical axis A. To the drive ring 66 is connected the diaphragm control ring 67. The diaphragm control ring 67 is held by the inner peripheral surface of the base portion 7d of the fixed barrel 7 so as to be rotatable around the optical axis A. A portion of the diaphragm control ring 67 is a diaphragm control lever 67a, which transmits a diaphragm control operation from the camera body. According to the above structure, the diaphragm control operation from the camera body is transmitted to the diaphragm drive plate, whereby the aperture blades 63 are stopped down to provide a predetermined aperture diameter.

In a state where the zoom ring 9 is not rotated around the optical axis A, for example, in the wide side, the key 102 fixed to the diaphragm supporting plate 61 is fitted in the guide groove 11 provided in the medium diameter portion 1b of the first lens unit shifting frame 1, and the guide groove 11 is parallel to the optical axis A, so that even though the third lens unit shifting frame 3 is rotated around the optical axis A at the time of focusing, the diaphragm supporting plate 61 is never rotated around the optical axis A. Then, when the diaphragm plate 62 is rotated through a predetermined amount around the optical axis A by the diaphragm control operation transmitted from the camera body via the diaphragm control lever 67a, the aperture is stopped down for a predetermined amount.

Next, when zooming is carried out by rotating the zoom ring 9, the guide groove 91 of the zoom ring 9 presses the pin 105 of the first cam ring 4, so that the first cam ring 4 is rotated. Accordingly, owing to the cooperative action of the cam pin 101 planted on the medium diameter portion 1b of the first lens unit shifting frame 1, the cam groove 41 of the first cam ring 4 and the guide groove 71 slightly inclined with respect to the optical axis A of the fixed barrel 7, the first lens unit shifting frame 1 is shifted in the direction of the optical axis A while being slightly rotated around the optical axis A. When the first lens unit shifting frame 1 is rotated around the optical axis A, as the key 102 fixed to the diaphragm supporting plate 61 is fitted in the guide groove 11 provided in the medium diameter portion 1b of the first lens unit shifting frame 1 in parallel with the optical axis A, the diaphragm supporting plate 61 is also rotated through the same angle. When the diaphragm supporting plate 61 is rotated around the optical axis A, the relative angle of the diaphragm supporting plate 61 and the diaphragm drive plate 62 is changed, so that the aperture diameter is changed by the zooming. In this state, when the diaphragm drive plate 62 is rotated through a predetermined angle, the diaphragm supporting plate 61 is not rotated, but the aperture blades 63 are rotated and stopped down to provide a predetermined aperture diameter. In the above, the guide groove 71 corresponds to a first guide member and the cam pin 101 corresponds to a first guided member. Also, the diaphragm supporting plate 61 corresponds to a diaphragm mechanism supporting member. Further, the guide groove 11 and the key 102 constitute an interlocking member.

(Other Embodiments)

It is to be noted that the present invention is not limited to the above embodiment. The above embodiment is an example of the present invention and has substantially the same structure as a technical idea disclosed in the appended claims of the present invention. Any form having the same operative effect is included in the technical scope of the present invention.

For example, in the first embodiment, the first guide member is the guide groove 71 of the elongated opening formed in the peripheral surface of the inner barrel portion 7c of the fixed barrel 7 so as to be slightly inclined with respect to the optical axis A, and the first guided member is the cam pin 101 provided on the peripheral surface of the cylindrical portion 1b of the first lens unit shifting frame 1 so as to project outside the peripheral surface thereof. However, the present invention is not limited thereto, and the first guide member may be a proper cam member, while the first guided member may be a cam follower to be guided by the cam member.

Also, in the first embodiment, the interlocking member comprises the guide groove 11 of the elongated opening formed in the peripheral surface of the cylindrical portion 1b of the first lens unit shifting frame 1 and the stick-like key 102 whose one end portion is secured to the diaphragm supporting plate 61 and whose other end portion is fitted in the guide groove 11. However, the present invention is not limited thereto, and the interlocking member may be constituted of a proper cam member and a cam follower to be guided by the cam member.

As described above, according to the embodiment of the present invention, at the time of zooming, the aperture diameter is corrected by rotating the zoom ring 9 of the zooming mechanism, shifting the first lens unit shifting frame 1 of the lens unit shifting frame in the direction of the optical axis A while it is being slightly rotated around the optical axis A, and rotating the diaphragm supporting plate 61 of the diaphragm mechanism supporting member in accordance with the slight rotation of the first lens unit shifting frame 1. Therefore, even though the diaphragm mechanism 6 is held by the third lens unit shifting frame 3 of the other lens unit shifting frame which is shifted while being rotated at the time of focusing, the aperture diameter can be corrected accurately without necessitating an extra device.

Also, at the time of zooming, in accordance with rotation of the zoom ring 9 of the rotating member around the optical axis, the guide groove 91 of the second guide member of the zoom ring 9 guides the pin 105 of the second guided member of the first cam ring 4 of the cam member to cause the first cam ring 4 to rotate. Simultaneously, the cam groove 41 of the third guide member of the first cam ring 4 guides the cam pin 101 of the first guided member and the cam pin 101 is guided by the guide groove 71 of the first guide member. Therefore, at the time of zooming, the first lens unit shifting frame 1 of the lens unit shifting frame is shifted in the direction of the optical axis while being slightly rotated around the optical axis, so that the aperture diameter can be corrected accurately.

Further, the first guide member is the guide groove 71 of the first elongated opening, which is formed in the peripheral surface of the medium diameter inner barrel portion 7c of the fixed barrel 7 so as to be slightly inclined with respect to the optical axis. The first guided member is the cam pin 101 provided on the peripheral surface of the medium diameter cylindrical portion 1b of the first lens unit shifting frame 1 of the lens unit shifting frame so as to project outside the peripheral surface thereof. As the cam pin 101 is fitted in the guide groove 71, the guide groove 71 can guide the cam pin 101 accurately.

Furthermore, the first lens unit shifting frame 1 of the lens unit shifting frame has the medium diameter cylindrical portion 1b. The interlocking member has the guide groove 11 of the second elongated opening and the stick-like key 102. The guide groove 11 is formed in the peripheral surface of the medium diameter portion 1b of the first lens unit shifting frame 1 in parallel with the optical axis. One end portion of the key 102 is secured to the diaphragm supporting plate 61 of the diaphragm mechanism supporting member and the other end portion thereof is fitted in the guide groove 11. Therefore, at the time of zooming, the interlocking member will not prevent the first lens unit shifting frame 1 from shifting in the direction of the optical axis, and slight rotation of the first lens unit shifting frame 1 around the optical axis can be transmitted accurately to the diaphragm supporting plate 61.

What is claimed is:

1. A zoom lens barrel comprising:
   a first lens unit;
   a second lens unit sharing an optical axis with said first lens unit;
   a fixed barrel to contain said first lens unit and said second lens unit;
   a first lens unit shifting frame held in said fixed barrel so as to be shiftable in a direction of said optical axis or in a direction around said optical axis for holding said first lens unit;
   a second lens unit shifting frame held in said first lens unit shifting frame so as to be shiftable in a direction of said optical axis or in a direction around said optical axis for holding said second lens unit;
   a zooming mechanism held by said fixed barrel so as to be rotatable around said optical axis for shifting said first lens unit shifting frame in said optical axis direction to perform zooming when said zooming mechanism is rotated around said optical axis;
   a focusing mechanism held by said fixed barrel so as to be rotatable around said optical axis for rotating said second lens unit shifting frame around said optical axis and shifting said second lens unit shifting frame in said optical axis direction to perform focusing when said focusing mechanism is rotated around said optical axis;

a diaphragm mechanism held by said second lens unit shifting frame so as to be rotatable around said optical axis for adjusting an aperture diameter when said diaphragm is rotated; and a diaphragm correcting mechanism including a first guide member provided in said fixed barrel so as to be inclined with respect to said optical axis;

a first guided member provided on said first lens unit shifting frame, said first guided member being guided by said first guide member to rotate said first lens unit shifting frame around said optical axis at the time of said zooming;

a diaphragm mechanism supporting plate held by said second lens unit shifting frame so as to be rotatable around said optical axis for rotating said diaphragm mechanism when said diaphragm mechanism supporting plate is rotated around said optical axis; and an interlocking member provided so as to be interlocked with said first lens unit shifting frame for transmitting rotation of said first lens unit shifting frame to said diaphragm mechanism supporting plate.

2. A zoom lens barrel according to claim 1, wherein said zooming mechanism includes a rotating member which is rotated around said optical axis at a time of said zooming and has a second guide member; and a cam member which has a second guided member and a third guide member, said cam member being rotated around said optical axis at the time of said zooming with said second guided member guided by said second guide member, said first guided member being guided by said third guide member and said first guide member, so that at the time of said zooming, said first lens unit shifting frame is shifted in said optical axis direction while being slightly rotated around said optical axis.

3. A zoom lens barrel according to claim 1, wherein said fixed barrel includes a cylindrical portion, said lens unit shifting frame has a cylindrical portion, said first guide member is a first elongated opening formed in a peripheral surface of said cylindrical portion of said fixed barrel so as to be inclined slightly with respect to said optical axis, and said first guided member is a projection which is provided so as to project outside a peripheral surface of said cylindrical portion of said first lens unit shifting frame and fitted in said first elongated opening.

4. A zoom lens barrel according to claim 1, wherein said first lens unit shifting frame includes a cylindrical portion, and said interlocking member has a second elongated opening formed in a peripheral surface of said cylindrical portion of said first lens unit shifting frame in parallel with said optical axis; and a stick-like member whose one end is fixed to said diaphragm mechanism supporting plate and whose other end is fitted in said second elongated opening.

* * * * *

UNITED STATES PATENT AND TRADEMARK OFFICE
CERTIFICATE OF CORRECTION

PATENT NO. : 5,663,839
DATED : September 2, 1997
INVENTOR(S) : Hideo Kanno

It is certified that error appears in the above-identified patent and that said Letters Patent is hereby corrected as shown below:

"On the title page, [56] References Cited "4,233,472 11/1980 Haraguchi" s/b --5,233,472 8/1993 Haraguchi--."

Signed and Sealed this

Tenth Day of March, 1998

Attest:

BRUCE LEHMAN

Attesting Officer

Commissioner of Patents and Trademarks